US009923252B2

(12) United States Patent
Nubbe

(10) Patent No.: US 9,923,252 B2
(45) Date of Patent: Mar. 20, 2018

(54) BATTERY PACK WITH VARIABLE-CONDUCTANCE HEAT PIPE (VCHP) COOLING

(71) Applicant: X Development LLC, Mountain View, CA (US)

(72) Inventor: Matthew A. Nubbe, Moriarty, NM (US)

(73) Assignee: X Development LLC, Mountian View, CA (US)

( * ) Notice: Subject to any disclaimer, the term of this patent is extended or adjusted under 35 U.S.C. 154(b) by 139 days.

(21) Appl. No.: 14/880,857

(22) Filed: Oct. 12, 2015

(65) Prior Publication Data

US 2016/0181676 A1    Jun. 23, 2016

Related U.S. Application Data

(60) Provisional application No. 62/093,121, filed on Dec. 17, 2014.

(51) Int. Cl.
*H01M 10/65* (2014.01)
*H01M 10/6552* (2014.01)
(Continued)

(52) U.S. Cl.
CPC ..... *H01M 10/6552* (2015.04); *H01M 2/1077* (2013.01); *H01M 2/1094* (2013.01);
(Continued)

(58) Field of Classification Search
None
See application file for complete search history.

(56) References Cited

U.S. PATENT DOCUMENTS

| 5,957,408 A | 9/1999 | Hall et al. |
| 6,073,888 A | 6/2000 | Gelon et al. |

(Continued)

FOREIGN PATENT DOCUMENTS

JP    2000277177 A    10/2000

OTHER PUBLICATIONS

PCT/US2015/061520—International Search Report and Written Opinion, dated Mar. 7, 2016, 12 pages.
(Continued)

*Primary Examiner* — Barbara L Gilliam
*Assistant Examiner* — Wyatt P McConnell
(74) *Attorney, Agent, or Firm* — Christensen O'Connor Johsnon Kindness PLLC

(57) ABSTRACT

An apparatus including a battery pack comprising a plurality of individual batteries arranged around a battery cavity such that each individual battery is in thermal contact with at least one neighboring individual battery. A variable-conductance heat pipe (VCHP) having an evaporator end and a condenser end, is positioned so that at least part of the evaporator end being positioned in the battery cavity and in thermal contact with each of the plurality of individual batteries. The apparatus includes a thermally insulating cover having an inside and an outside, wherein the battery pack and the part of the VCHP evaporator end in the battery cavity are positioned inside the thermally insulating cover and at least part of the condenser end of the VCHP is outside the thermally insulating cover, and wherein the VCHP is substantially the only thermal path between the battery pack and the outside. Other implementations are disclosed and claimed.

24 Claims, 7 Drawing Sheets

(51) Int. Cl.
  *H01M 2/10*     (2006.01)
  *H01M 10/625*   (2014.01)
  *H01M 10/653*   (2014.01)
  *H01M 10/64*    (2014.01)
  *H01M 10/6551*  (2014.01)
  *H01M 10/613*   (2014.01)

(52) U.S. Cl.
  CPC ....... *H01M 10/613* (2015.04); *H01M 10/625* (2015.04); *H01M 10/64* (2015.04); *H01M 10/653* (2015.04); *H01M 10/6551* (2015.04); *H01M 2220/20* (2013.01)

(56) References Cited

U.S. PATENT DOCUMENTS

| | | | |
|---|---|---|---|
| 6,104,611 A | 8/2000 | Glover et al. | |
| 7,270,295 B2 | 9/2007 | Bennett | |
| 7,967,256 B2* | 6/2011 | Wong | B64G 1/425 244/171.8 |
| 8,132,412 B2 | 3/2012 | Bennett | |
| 8,231,996 B2 | 7/2012 | Howard et al. | |
| 2003/0183381 A1* | 10/2003 | Garner | F28D 15/0275 165/274 |
| 2004/0081885 A1* | 4/2004 | Ziegler | H01M 2/105 429/120 |
| 2007/0125522 A1* | 6/2007 | Stefanoski | F28D 1/024 165/104.21 |
| 2010/0065691 A1* | 3/2010 | Droney | B64C 7/02 244/53 R |

OTHER PUBLICATIONS

William G. Anderson et al., "Variable Conductance Heat Pipes for Variable Thermal Links," 42$^{nd}$ International Conference on Environmental Systems (ICES 2012), San Diego, CA, Jul. 15-19, 2012, 14 pages.

PCT/US2015/061520—International Preliminary Report on Patentability dated Jun. 29, 2017, 9 pages.

* cited by examiner

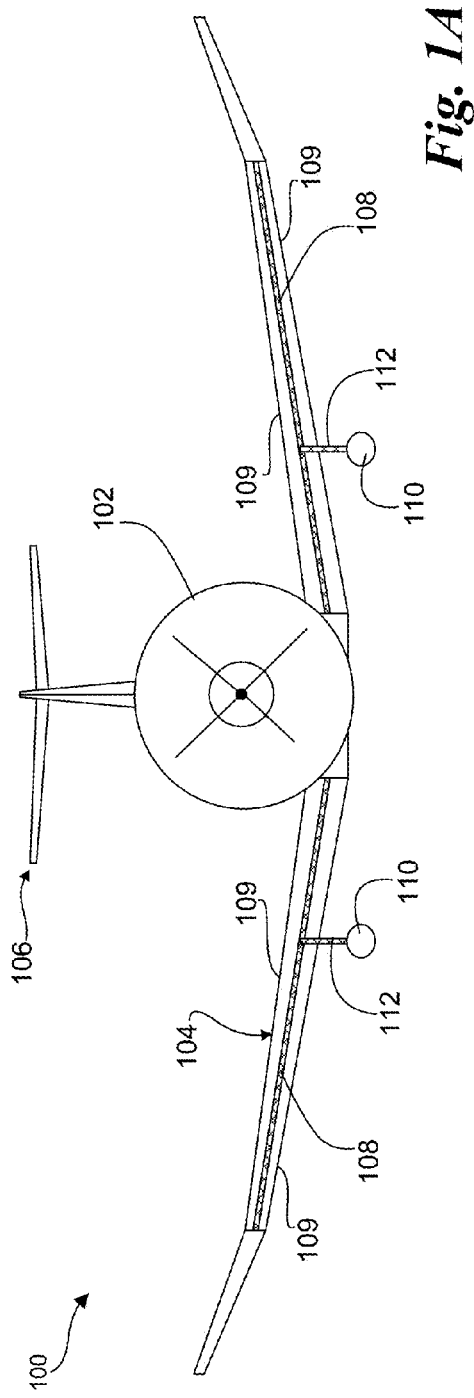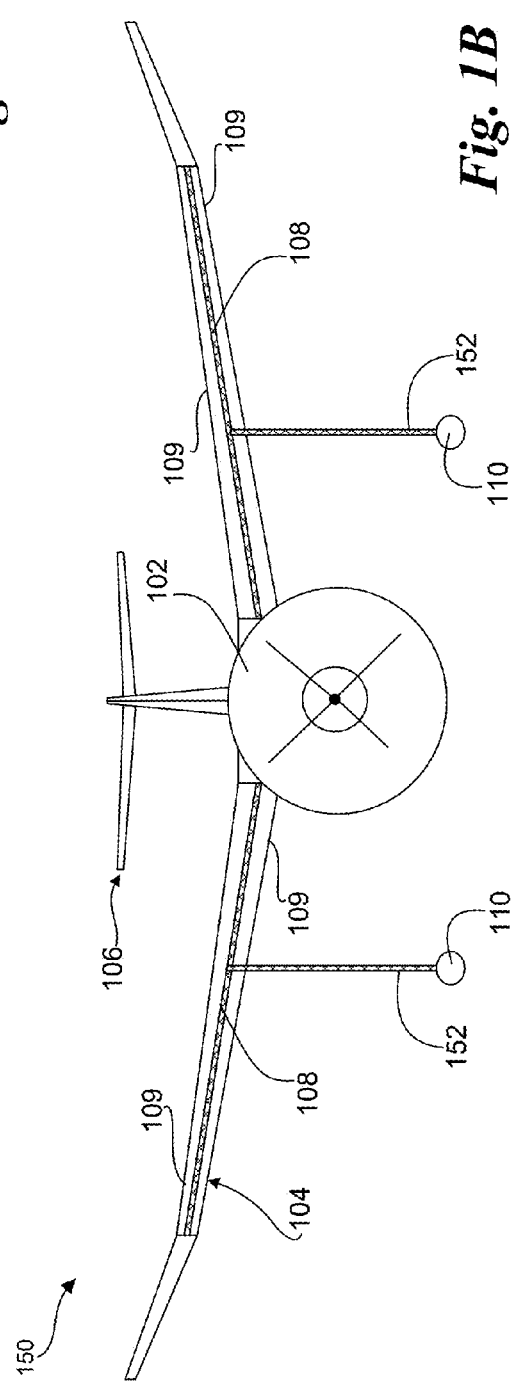

BATTERY PACK WITH VARIABLE-CONDUCTANCE HEAT PIPE (VCHP) COOLING

CROSS-REFERENCE TO RELATED APPLICATIONS

This application claims priority under 35 U.S.C. § 119(e) to U.S. Provisional Patent Application No. 62/093,121, filed 17 Dec. 2014.

TECHNICAL FIELD

The disclosed implementations relate generally to battery pack cooling and in particular, but not exclusively, to battery packs cooled using a variable conductance heat pipe (VCHP).

BACKGROUND

Regulating the temperature of a battery in a low-speed, high-altitude, long-endurance aircraft is difficult. Protecting the battery from the cold without significant heating power requires very good insulation, but the insulation makes it necessary to cool the battery when it gets hot during periods of heavy use. Common solutions for controlled cooling all involve moving parts, which are of particular concern on long endurance flights, so that a solution that minimizes additional heating burden while providing high reliability is thus desired.

For terrestrial applications, cooling fans are the near-universal standard for system temperature control. This works fine, but has potential reliability issues for a long endurance aircraft. More importantly, however, is that high altitude air is too thin for effective use of cooling fans. Venting air from an aircraft's incoming airstream, while another option, poses a question of how to ensure the system will not fail in a potentially detrimental way.

BRIEF DESCRIPTION OF THE DRAWINGS

Non-limiting and non-exhaustive implementations of the present invention are described with reference to the following figures, wherein like reference numerals refer to like parts throughout the various views unless otherwise specified.

FIGS. 1A-1B are front-view diagrams of aircraft implementations.

FIG. 3B is a section taken substantially along section line B-B in FIG. 3A.

DETAILED DESCRIPTION OF THE ILLUSTRATED IMPLEMENTATIONS

Figure 2:
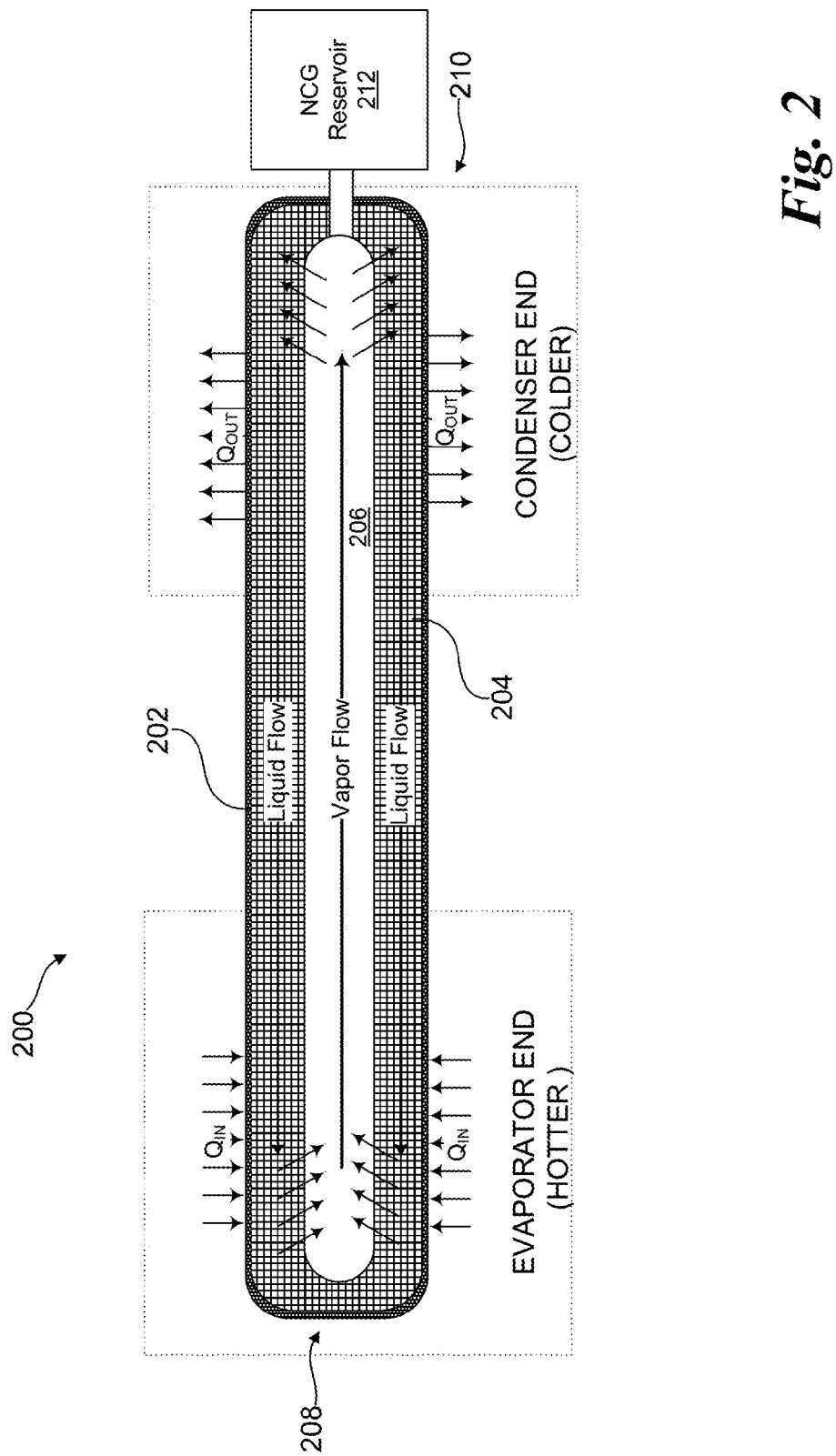
FIG. 2 is a schematic diagram of an implementation of a variable conductance heat pipe.

Implementations are described of an apparatus, system, and method for cooling battery packs in high-altitude, long-endurance aircraft using a variable conductance heat pipe (VCHP). Specific details are described to provide a thorough understanding of the implementations, but one skilled in the relevant art will recognize that the invention can be practiced without one or more of the described details, or with other methods, components, materials, etc. In some instances, well-known structures, materials, or operations are not shown or described in detail but are nonetheless encompassed within the scope of the invention.

Reference throughout this specification to "one implementation" or "an implementation" means that a described feature, structure, or characteristic can be included in at least one described implementation, so that appearances of "in one implementation" or "in an implementation" do not necessarily all refer to the same implementation. Furthermore, the particular features, structures, or characteristics may be combined in any suitable manner in one or more implementations.

FIGS. 1A-1B illustrate implementations of a high-altitude, high-endurance aircraft. FIG. 1A illustrates an implementation of an aircraft 100 that includes a fuselage 102 structurally coupled to a wing 104 and a tail 106. Aircraft 100 is a low-wing aircraft, meaning that fuselage 102 sits on wing 104 or, put differently, wing 104 is positioned in the lower part of fuselage 102. Wing 104 includes a spanwise-running spar 108, which is one of its main structural members along with a chordwise-running ribs (not shown) and a wing skin 109.

Battery containment pods 110 are coupled to spar 108 by pylons 112. Battery containment pods 110 allow aircraft 100 to safely carry batteries away from the main structural elements of aircraft 100, so that the batteries can safely store electrical power generated by other onboard systems such as solar panels on or in wing skin 109 and can provide power to one or more motors that drive propellers to propel the aircraft, as well as to onboard systems such as navigation electronics, communication electronics, etc.

FIG. 1B illustrates another implementation of an aircraft 150. Aircraft 150 is similar in most respects to aircraft 100, except that aircraft 150 has a high-wing configuration, meaning that the wing is positioned in the top of fuselage 102 rather than the bottom or, put differently, that the fuselage hangs from the wing rather than being positioned above. As a result of the high-wing configuration, pylons 152 are longer than pylons 112, but other implementations of aircraft 150 can have pylons 152 shorter than shown.

FIG. 2 illustrates an implementation of a variable conductance heat pipe (VCHP) 200. VCHPs such as VCHP 200 are commercially available from various sources including Advanced Cooling Technologies, Inc., of Lancaster, Pa., USA; Thermacore, Inc., of Lancaster, Pa., USA; or CRS Engineering of Morpeth, England, UK.

VCHP 200 has an evaporator end 208, a condenser end 210, and is formed of an elongated pipe 202. A wick 204 is positioned within pipe 202 so that it forms a channel 206 inside the pipe through which vapor can move from evaporator end 208 to condenser end 210. Pipe 202 can be made of a high-thermal-conductivity material such as metal in one implementation, but in other implementations pipe 202 can be made of a thermally conductive non-metal. Wick 204 can be made of a material that exhibits capillary action and can have different configurations within pipe 202. In the illustrated implementation, wick 204 is an axial or annular wick that hugs the interior walls of pipe 202 and forms channel 206 along the center of pipe 202. But in other implementations wick 204 could have a different configurations such as a slab-type wick running down the middle of pipe 202, in which case channel 206 would include a pair of channels running along the length of pipe 202 on either side of the slab wick. A working fluid is contained within pipe 202 to transfer heat from one into the other, as described below; examples of possible working fluids include water, methanol, ammonia, potassium, sodium, lithium.

A non-condensing gas (NCG) reservoir 212 holds a quantity of non-condensing gas and is fluidly coupled to channel 206 at condenser end 210 so that a quantity of non-condensing gas can be injected into channel 206; examples of non-condensing gases that can be used in different implementations include any of the noble gases (e.g., helium (He), neon (Ne), argon (Ar), krypton (Kr), or xenon (Xe)) or nitrogen (N). When VCHP 200 is not operating, the NCG and working fluid vapor are mixed throughout channel 206. But when the VCHP is operating the flow of vapor-phase working fluid pushes the NCG toward condenser end 210. Most of the NCG is in reservoir 212, but the remainder blocks part of condenser end 210. The NCG, then, effectively changes the active length of the condenser. If heat input Qin or the temperature of the evaporator end increases, the heat pipe vapor temperature and pressure increase; this forces more NCG into reservoir 212, which increases the active condenser length and, as a result, increases the heat pipe conductance. But if heat input Qin or the temperature of evaporator end 208 decreases, the heat pipe vapor temperature and pressure decrease and the NCG expands to decrease the active condenser length and, as a result, decrease the heat pipe conductance.

In operation of VCHP 200, evaporator end 208 is put in thermal contact with a system to be cooled so that it acts as a heat sink for the system being cooled, while condenser end 210 put in a location with a lower temperature than evaporator end 208. Heat Qin from the system being cooled flows into evaporator end 208, where it heats and evaporates working fluid in wick 204—that is, the incoming heat changes liquid-phase working fluid in wick 204 into vapor-phase working fluid in channel 206. The vapor-phase working fluid travels through channel 206 to condenser end 210. Condenser end 210 is cooler, causing heat Qout to be transferred out at the condenser end and resulting in a temperature decrease of the vapor-phase working fluid. This temperature decrease causes the vapor-phase working fluid in channel 206 to condense back into liquid-phase working fluid and be reabsorbed into wick 204. Wick 204 transports the liquid-phase working fluid back to evaporator end 208, where heating begins anew.

Figure 3A:
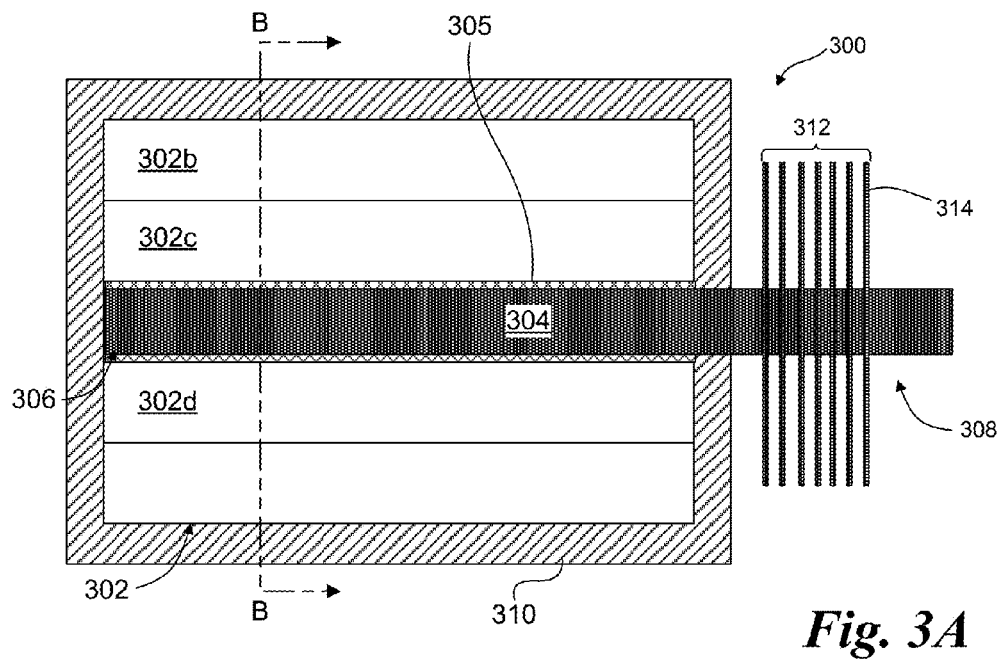
FIGS. 3A-3B are sectional views of an implementation of a battery pack cooling assembly.
Figure 3B:
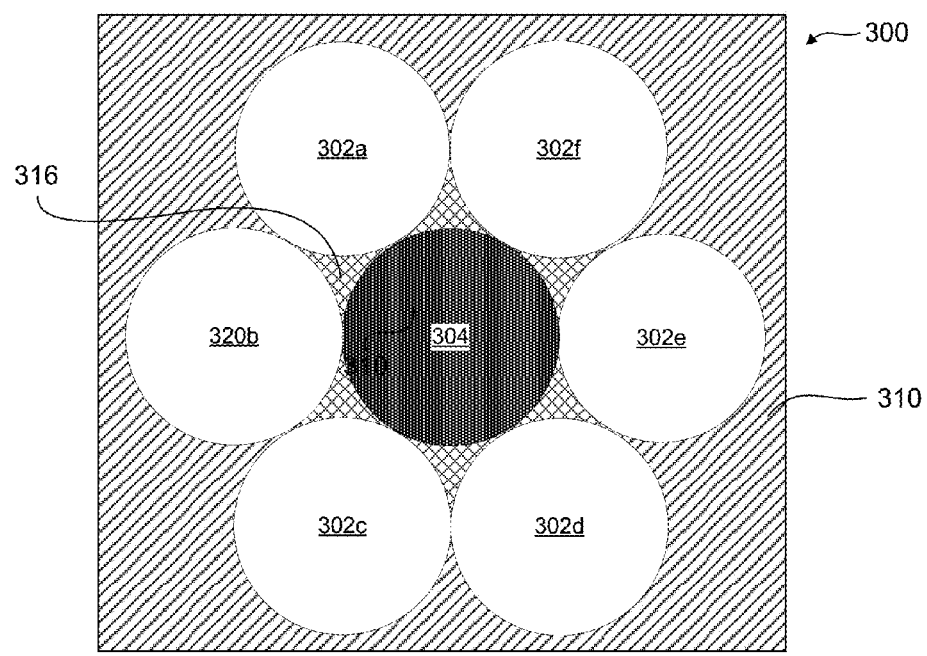

FIGS. 3A-3B together illustrate an implementation of a battery pack cooling assembly 300. Battery pack cooling assembly 300 includes a battery pack 301 having a plurality of individual batteries 302 position relative to each other to form a battery cavity 305. In the illustrated implementation battery pack 301 includes six individual batteries 302a-302f, but other implementations can include more or fewer individual batteries. In the illustrated implementation the individual batteries are right-circular cylinders (cylinders with circular cross-section), but in other implementations the individual batteries can have different shapes, such as pouch-shaped or cylindrical with other cross-sectional shapes (see, e.g., FIGS. 4B-4C).

Variable conductance heat pipe (VCHP) 304 has an evaporator and 306 and a condenser and 308. At least part of evaporator end 306 is positioned within battery cavity 305 so that it is in thermal contact with all the individual batteries 302a-302f. In one implementation a thermal interface material (TIM) 316 can be used to fill any space in battery cavity 305 not occupied by evaporator end 308. In one implementation TIM 316 can be a thermal paste, but in other implementations TIM 316 can be another material such as a thermally conductive adhesive.

A thermally insulating cover 310 is positioned around battery pack 301 so that the battery pack 301 is inside thermally insulating cover 310; in other words, thermally insulating cover 310 surrounds all the individual batteries 302a-302f, as well as the part of evaporator end 306 within battery cavity 305. At least part of condenser end 308 extends outside thermally insulating cover 310, so that VCHP 304 provides the only thermal contract on contact between battery pack 301 and the exterior. In the illustrated implementation a radiator 312 including a plurality of cooling fins 314 is formed at or near condenser end 308, outside thermally insulating cover 310, to enhance heat transfer from the condenser end, but other implementations of VCHP 304 can have a different heat-transfer enhancement device coupled to the condenser end 308.

Figure 4A:
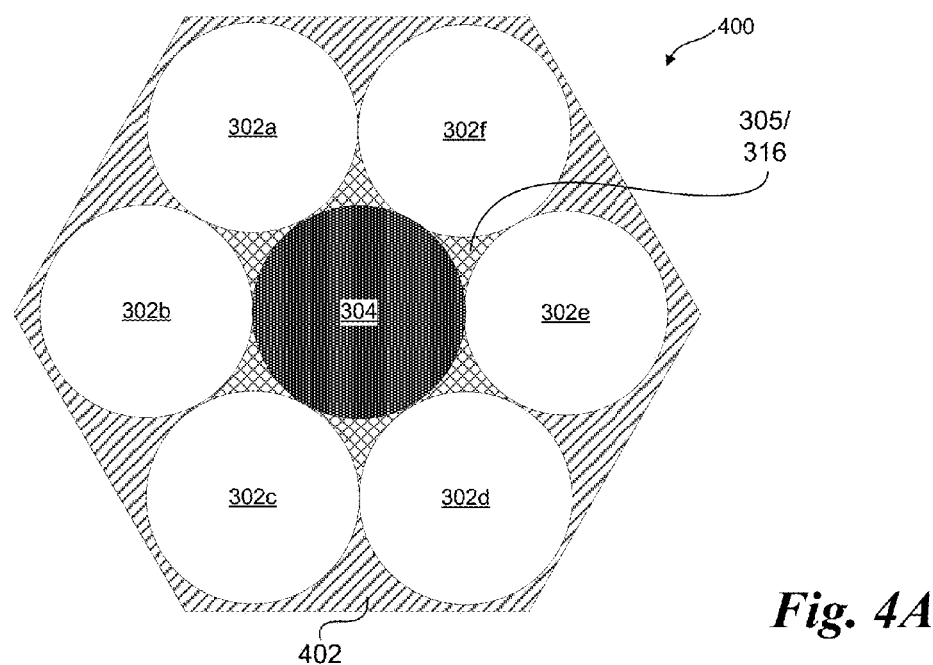
FIGS. 4A-4C are sectional views of alternative implementations of battery pack cooling assemblies.
Figure 4B:
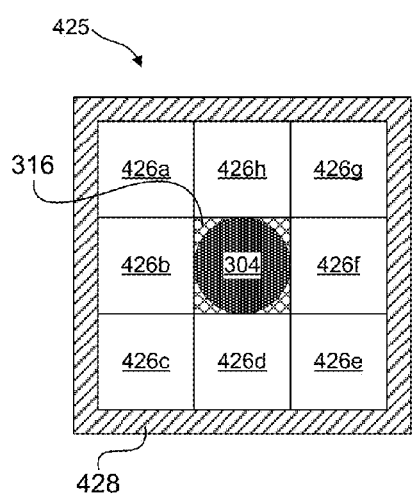
Figure 4C:
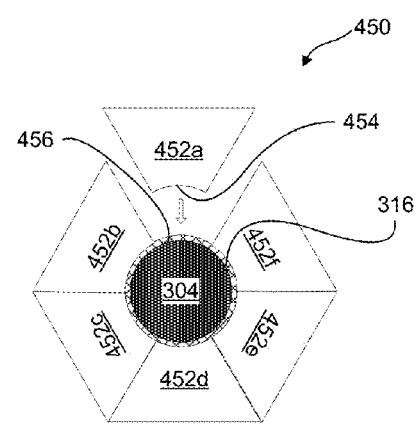

FIGS. 4A-4C illustrate alternative implementations of battery pack cooling assemblies. FIG. 4A illustrates a battery pack cooling assembly 400 similar in most respects to battery pack cooling assembly 300. The primary difference is that cooling assembly 400 has a differently-shaped thermally insulating cover 402. Thermally insulating cover 402 is hexagonal so that its outside shape more closely conforms to an outer shape of the battery pack. Such an implementation can be useful if a more compact cooling assembly is needed.

FIG. 4B illustrates another implementation of a battery pack cooling assembly 425. Cooling assembly 425 is similar in most respects to cooling assembly 300. The primary differences are that cooling assembly 425 has a different number of individual batteries—eight individual batteries 426a-426h in this implementation—and that the individual batteries have a quadrilateral cross-section, meaning that they are substantially right-quadrilateral cylinders. As in cooling assembly 300, cooling assembly 425 can also include thermal interface material 316 to occupy space in the battery cavity not occupied by VCHP 304. Other implementations of individual batteries 426a-426h can have other quadrilateral shapes—rectangular, for instance.

FIG. 4C illustrates another implementation of a battery pack cooling assembly 450. Cooling assembly 450 is similar in most respects to cooling assembly 300; the primary difference is that in cooling assembly 450 the six individual batteries 452a-452f have a different shape. Individual batteries 452a-452f have substantially trapezoidal cross-sections, but each individual battery 452 also has a surface 454 shaped to substantially conform to the outer contour 456 of VCHP 304. This battery configuration can be helpful to maximize thermal contact between individual batteries 452a-452f and VCHP 304. As in other implementations, thermal interface material 316 can be used to take up any space in the battery cavity formed by individual batteries 452a-452f but not taken up by VCHP 304.

Figure 5A:
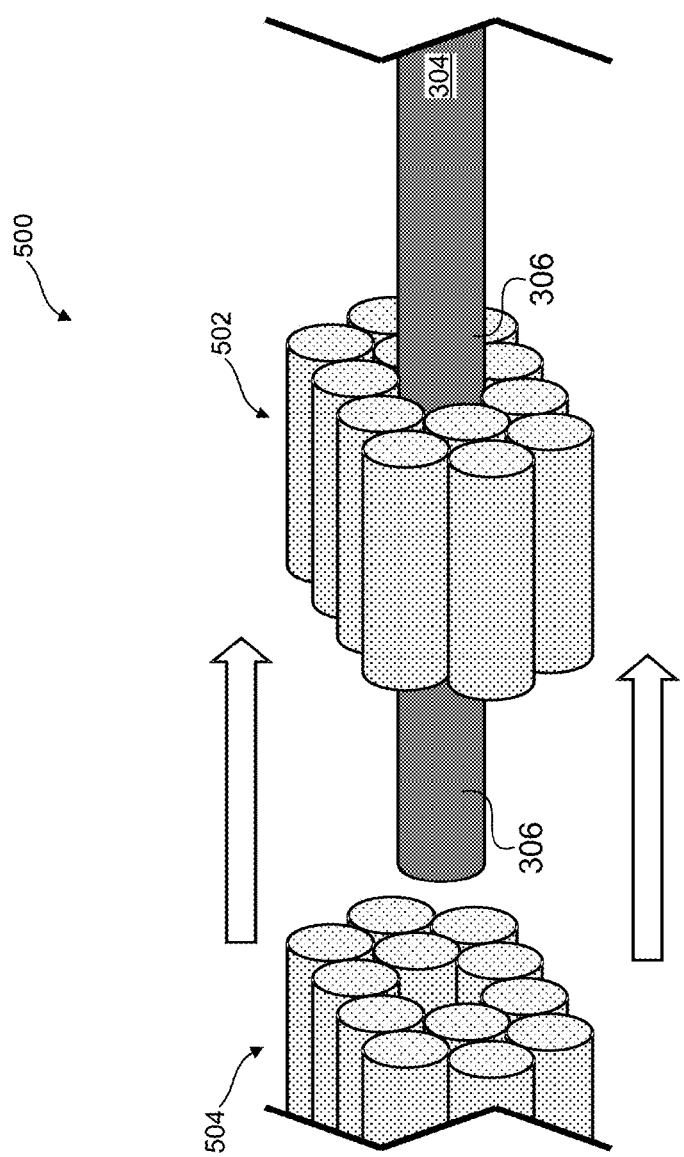
FIGS. 5A-5C are side sectional views of alternative implementations of battery pack cooling assemblies including multiple battery packs.
Figure 5B:
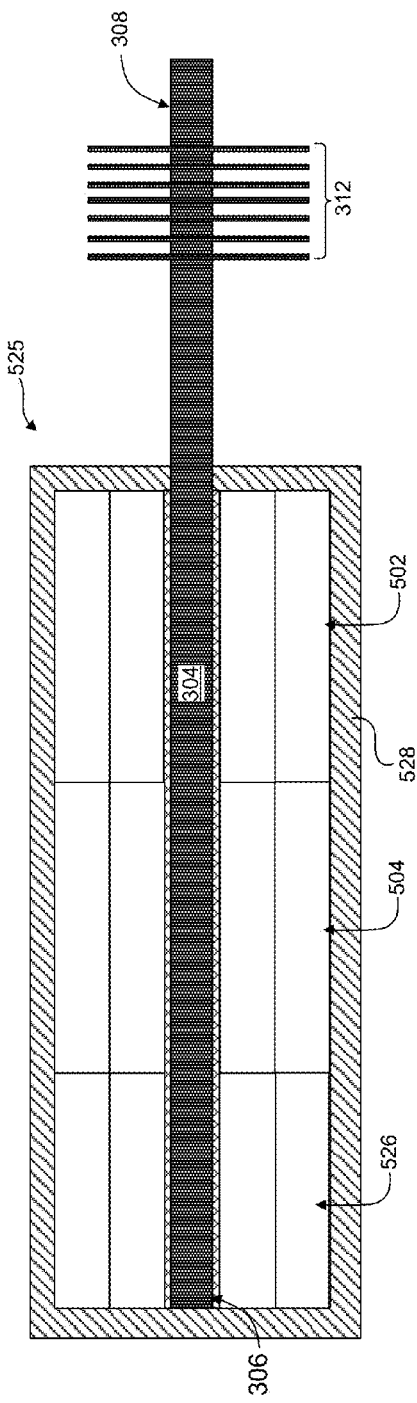
Figure 5C:
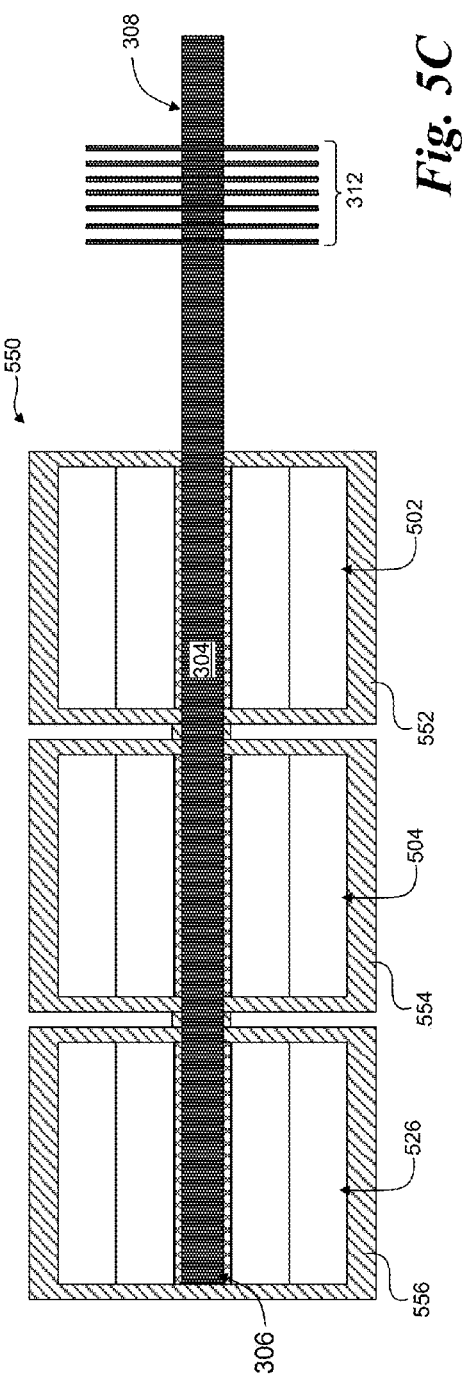

FIGS. 5A-5C illustrate implementations of battery pack cooling assemblies with multiple battery packs. FIG. 5A illustrates assembly of a battery pack cooling assembly 500. VCHP 304 is positioned so that at least part of evaporator end 306 is within the battery cavities of multiple battery packs, such as battery packs 502 and 504. Although two battery packs 502 and 504 are shown in the illustrated implementation, other implementations can have more than two battery packs thermally coupled to evaporator end 306 (see, e.g., FIGS. 5B-5C).

FIG. 5B illustrates an implementation of a battery pack cooling assembly 525 with multiple battery packs. The construction of battery pack cooling assembly 525 is substantially similar to battery pack cooling assembly 300. The primary difference is that cooling assembly 525 includes three battery packs 502, 504, and 526, all positioned inside the same thermally insulating cover 528. Other implementations, of course, can have a different number of battery packs than shown within thermally insulating cover 528.

FIG. 5C illustrates an implementation of a battery pack cooling assembly 550 having multiple battery packs. Cooling assembly 550 is substantially similar to battery pack cooling assembly 525; the primary difference is that cooling assembly 550 includes three battery packs 502, 504, and 526, each positioned within a separate thermally insulating cover: battery pack 502 within thermally insulating cover 552, battery pack 504 within thermally insulating cover 554, and battery pack 526 within thermally insulating cover 556. The portions of VCHP 304 extending between thermally insulating covers 552, 554, and 556 can also be insulated as shown in some implementations. As with battery pack cooling assembly 525, the illustrated implementation of cooling assembly 550 has three batteries but other implementations can have a different number.

Figure 6:
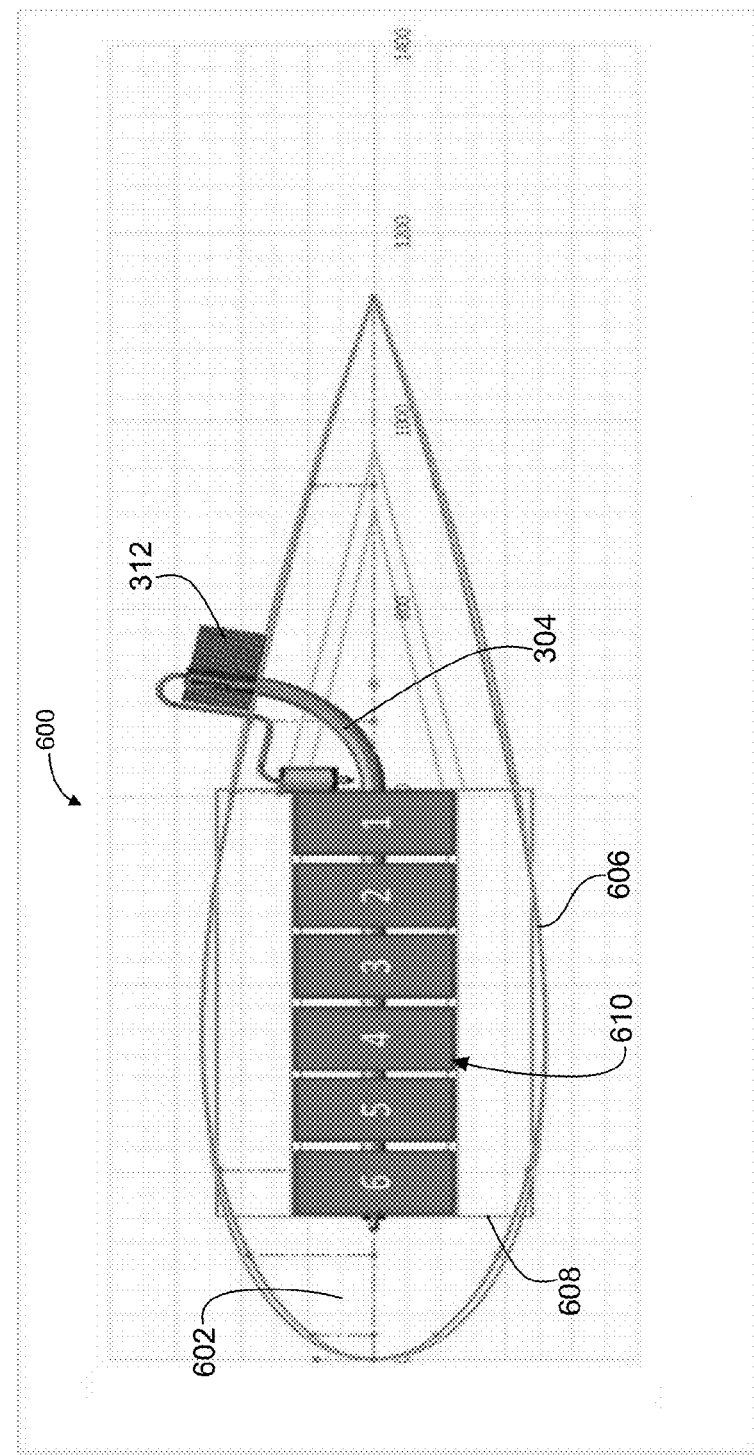
FIG. 6 is a side sectional view of an implementation of an aircraft battery pod including a battery pack cooling assembly.

FIG. 6 illustrates an implementation of a battery containment pod 600 that can be used together with any battery pack cooling assembly described herein. Implementations of battery containment pod 600 can be used as pods 110 in the aircraft configurations shown in FIGS. 1A-1B. Pod 600 is formed of a thermally insulating material 602 and has the cross-sectional shape of a symmetrical airfoil. A cavity 608 is formed in material 602 to house a battery pack cooling assembly 610, which can be any of the ones described above, as well as other electronics and associated equipment. Cavity 608 thus can house components such as battery packs 1-6, as well as VCHP 304 to conduct heat away from battery packs 1-6 and regulate their temperature. VCHP 304 extends from battery packs 1-6 so that its condenser end is outside outer surface 606, where it is thermally coupled to radiator 312 that can enhance heat transfer into external air flowing over the pod.

Thermally insulating material 602 can be a material that is easily formed; in one implementation material 602 can be extruded polystyrene (XPS), but other materials can be used. The interior of cavity 608 can be lined with materials such as metal foils, aramid fiber materials such as Kevlar, or other materials, for further thermal insulation and fire protection. In one implementation, thermally insulating material 602 can itself form the thermally insulating cover for the battery packs within cavity 608, so that it replaces thermally insulating covers 310, 402, 428,528, etc. A channel can be formed in material 602 to accommodate VCHP 304. A coating of a thin, smooth material is put on outer surface 606 to give the pod a smooth and aerodynamic exterior surface. All or part of pod 600 can include an "exoskeleton" to provide hard points where the pod can be securely attached to an aircraft by a pylon such as pylon 112. In one implementation the frame or exoskeleton can be made of carbon fiber, but in other implementations metals, plastics, aramid fiber materials such as Kevlar, or other materials can be used.

The above description of illustrated implementations of the invention, including what is described in the abstract, is not intended to be exhaustive or to limit the invention to the precise forms disclosed. Although specific implementations and examples are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. An apparatus comprising:
a thermally insulating cover forming an enclosure;
a battery pack comprising a plurality of individual batteries disposed within the enclosure, wherein the plurality of individual batteries are arranged around a battery cavity such that each individual battery is in thermal contact with at least one neighboring individual battery and all of the individual batteries of the battery pack within the enclosure are immediately adjacent to the battery cavity; and
a variable-conductance heat pipe, VCHP, having an evaporator end and a condenser end, at least part of the evaporator end being positioned in the battery cavity and in thermal contact with each of the plurality of individual batteries within the enclosure,
wherein the battery pack and the part of the VCHP evaporator end in the battery cavity are positioned inside the enclosure formed by the thermally insulating cover and at least part of the condenser end of the VCHP is external to the thermally insulating cover, and wherein the VCHP is substantially the only thermal path between the battery pack and an outside of the enclosure formed by the thermally insulating cover.

2. The apparatus of claim 1, further comprising a radiator thermally coupled to the condenser end of the VCHP, the radiator including a plurality of heat-conducting fins.

3. The apparatus of claim 1, further comprising a thermal interface material, TIM, disposed in the cavity between the individual batteries and the evaporator end of the VCHP.

4. The apparatus of claim 3 wherein the TIM is a thermal paste or a thermally conductive adhesive.

5. The apparatus of claim 1 wherein the plurality of individual batteries includes six batteries arranged around the cavity in a substantially hexagonal arrangement.

6. The apparatus of claim 1, further comprising one or more additional battery packs each having a corresponding battery cavity therein within which at least part of the evaporator end is positioned so that at least part of the evaporator end is in thermal contact with the individual batteries in each of the one or more additional battery packs.

7. The apparatus of claim 6 wherein the battery pack and the one or more additional battery packs are positioned within the same thermally insulating cover.

8. The apparatus of claim 6 wherein the battery pack and the one or more additional battery packs are positioned within different thermally insulating covers.

9. The apparatus of claim 1 wherein the individual batteries in the battery pack are substantially cylindrical.

10. The apparatus of claim 9 wherein the individual batteries have a circular cross-sectional shape.

11. The apparatus of claim 1 wherein the individual batteries have a quadrilateral cross-sectional shape.

12. The apparatus of claim 1 wherein the individual batteries have a substantially trapezoidal cross-section with one side of the trapezoidal cross-section shaped to substantially match an exterior shape of the VCHP.

13. A system comprising:
a battery containment pod comprising:
- a body formed of a material, the body having an exterior shape and an interior cavity formed in the material, the size and shape of the interior cavity designed to accommodate a battery assembly,
- an exterior coating covering the exterior shape of the body, and
- an attachment structure formed in or on the body to allow the body to be coupled to a flight vehicle; and a battery assembly positioned within the battery containment pod, the battery assembly comprising:
- a thermally insulating cover forming an enclosure;
- a battery pack comprising a plurality of individual batteries disposed within the enclosure, wherein the plurality of individual batteries are arranged around a battery cavity such that each individual battery is in thermal contact with at least one neighboring individual battery and all of the individual batteries of the battery pack within the enclosure are immediately adjacent to the battery cavity; and
- a variable-conductance heat pipe, VCHP, having an evaporator end and a condenser end, at least part of the evaporator end positioned within the battery cavity and in thermal contact with each of the plurality of individual batteries within the enclosure and at least part of the condenser end positioned outside the battery containment pod, wherein the battery pack and the part of the VCHP evaporator end in the battery cavity are positioned inside an enclosure formed by the thermally insulating cover and at least part of the condenser end of the VCHP is external to the enclosure formed by the thermally insulating cover, and wherein the VCHP is substantially the only thermal path between the battery pack and an outside of the enclosure formed by the thermally insulating cover.

14. The system of claim 13, further comprising a radiator thermally coupled to the condenser end of the VCHP, the radiator including a plurality of heat-conducting fins.

15. The system of claim 13, further comprising a thermal interface material, TIM, disposed in the cavity between the individual batteries and the evaporator end of the VCHP.

16. The system of claim 15 wherein the TIM is a thermal paste or a thermally conductive adhesive.

17. The system of claim 13 wherein the plurality of individual batteries includes six batteries arranged around the battery cavity in a substantially hexagonal arrangement.

18. The system of claim 13, further comprising one or more additional battery packs each having a corresponding battery cavity therein within which at least part of the evaporator end is positioned so that at least part of the evaporator end is in thermal contact with the individual batteries in each of the one or more additional battery packs.

19. The system of claim 18 wherein the battery pack and the one or more additional battery packs are positioned within the same thermally insulating cover.

20. The system of claim 19 wherein the battery pack and the one or more additional battery packs are positioned within different thermally insulating covers.

21. The system of claim 13 wherein the individual batteries in the battery pack are substantially cylindrical.

22. The system of claim 21 wherein the individual batteries have a circular cross-sectional shape.

23. The system of claim 13 wherein the individual batteries have a quadrilateral cross-sectional shape.

24. The system of claim 13 wherein the individual batteries have a substantially trapezoidal cross-section with one side of the trapezoidal cross-section shaped to substantially match an exterior shape of the VCHP.

* * * * *